US009696786B2

(12) United States Patent
Panda et al.

(10) Patent No.: US 9,696,786 B2
(45) Date of Patent: Jul. 4, 2017

(54) SYSTEM AND METHOD FOR OPTIMIZING ENERGY CONSUMPTION BY PROCESSORS

(71) Applicant: Tata Consultancy Services Ltd., Mumbai, Maharashtra (IN)

(72) Inventors: Prasanta Panda, Bhubaneswar (IN); Brajesh Singh, Mumbai (IN)

(73) Assignee: Tata Consultancy Services Ltd. (IN)

( * ) Notice: Subject to any disclaimer, the term of this patent is extended or adjusted under 35 U.S.C. 154(b) by 0 days.

(21) Appl. No.: 14/848,632

(22) Filed: Sep. 9, 2015

(65) Prior Publication Data
US 2016/0320825 A1 Nov. 3, 2016

(30) Foreign Application Priority Data

Apr. 29, 2015 (IN) .......................... 1702/MUM/2015

(51) Int. Cl.
G06F 1/32 (2006.01)
G06F 1/00 (2006.01)
G06F 9/50 (2006.01)

(52) U.S. Cl.
CPC ............ *G06F 1/3234* (2013.01); *G06F 1/324* (2013.01); *G06F 1/3206* (2013.01); *G06F 1/329* (2013.01); *G06F 1/3296* (2013.01); *G06F 9/5094* (2013.01)

(58) Field of Classification Search
CPC .................................................. G06F 1/3203
(Continued)

(56) References Cited

U.S. PATENT DOCUMENTS 6,611,726 B1 8/2003 Crosswhite
7,039,559 B2 5/2006 Froehlich et al.
(Continued)

FOREIGN PATENT DOCUMENTS

WO 2013055399 A1 4/2013
WO 2014075108 A2 5/2014

OTHER PUBLICATIONS

Miftakhutdinov et al., "Predicting Performance Impact of DVFS for Realistic Memory Systems", Proceedings of the 2012 45th Annual IEEE/ACM International Symposium on Microarchitecture, 2012, pp. 155-165.
(Continued)

*Primary Examiner* — Suresh Suryawanshi
(74) *Attorney, Agent, or Firm* — Blueshift IP, LLC; Robert Plotkin

(57) ABSTRACT

Methods and systems for selecting an appropriate forecasting model for accurate workload prediction of a processor is disclosed. The processor is configured to monitor workload and extract workload history of the processor for a given time interval. Further, the processor is configured to create plurality of forecasting models based on the extracted workload history and apply the group of forecasting model on the extracted workload history to obtain a plurality of predicted future workload for the given time interval. Further, the processor is configured to compute an error measure of the plurality of predicted future workload in reference to an actual workload of the processor and select the appropriate forecasting model from plurality of the forecasting models having least error measure among the computed error measures for dynamically scaling frequency and voltage required by the processor and thereby optimizing energy consumption in the processor.

9 Claims, 3 Drawing Sheets

(58) Field of Classification Search
USPC .......................................................... 713/320
See application file for complete search history.

(56) References Cited

U.S. PATENT DOCUMENTS

| | | | |
|---|---|---|---|
| 7,512,822 B2 | 3/2009 | Fung | |
| 7,770,034 B2 | 8/2010 | Nanja | |
| 7,971,073 B2* | 6/2011 | Hsu ....................... | G06F 1/3203 |
| | | | 713/1 |
| 8,015,423 B1* | 9/2011 | Satterfield ............. | G06F 1/3206 |
| | | | 710/104 |
| 8,190,939 B2* | 5/2012 | Fields, Jr. ............. | G06F 1/3203 |
| | | | 713/320 |
| 8,904,209 B2* | 12/2014 | Davis .................... | G06F 1/3206 |
| | | | 709/220 |
| 9,396,444 B2* | 7/2016 | Bates ..................... | G06Q 30/02 |
| 2006/0184287 A1* | 8/2006 | Belady .................. | G06F 1/3203 |
| | | | 700/291 |
| 2009/0013201 A1* | 1/2009 | He ........................ | G06F 1/3203 |
| | | | 713/322 |
| 2010/0218005 A1* | 8/2010 | Jain ....................... | G06F 9/5094 |
| | | | 713/300 |

OTHER PUBLICATIONS

Snowdon of al., "Accurate On-line Prediction of Processor and Memory Energy Usage Under Voltage Scaling", Proceedings of the 7th ACM & IEEE international conference on Embedded software, 2007, pp. 84-93.

* cited by examiner

SYSTEM AND METHOD FOR OPTIMIZING ENERGY CONSUMPTION BY PROCESSORS

TECHNICAL FIELD

The present invention relates to voltage and frequency scaling in processors and, particularly but not exclusively, to methods and systems for accurate workload prediction of a processor for dynamic voltage and frequency scaling.

BACKGROUND

Typically, as transistor count in a chip increases, operating frequency to match speed requirement also increases. With this, power consumption and dissipation in the chip also increases multiple times. Conventionally, power consumption is an over-riding concern in the design of a processor of computer systems. Dynamic voltage frequency scaling (DVFS) is a power management technique, that dynamically scales voltage and frequency (v-f) settings of the processor so as to provide just-enough speed to process system workload at a given point of time. Further, scaling down of voltage levels results in a quadratic reduction in processors dynamic power consumption. Further, conventional DVFS power management techniques have demonstrated its ability to achieve energy savings while keeping performance degradation under acceptable limits. However, workload prediction of the processor is essentially an important consideration for performing the DVFS. Accurate workload prediction of the processor can lead to accuracy in frequency generation which in turn can lead to accuracy in voltage generation.

However, an important challenge in managing generation of frequency and voltage by the processor is that the processor is required to cater to variable workload and the processor is also required to be capable of estimating or anticipating future workload. In the absence of effective workload prediction, the processor is not capable of allocating appropriate computing resources to meet a workload level increase or, conversely, reduce resource under-utilization in the event of a decreasing workload level.

Currently, workload prediction of processors use fixed model for forecasting future workload irrespective of varying workload history. In this respect, one fixed model may not give accurate forecasting of future workload specifically with the varying processor workload profile. Further, conventional fixed forecastable models used for forecasting future workload may not have good accuracy for different workload scenarios. In an example, for a particular workload profile, the fixed forecastable model may give prediction accuracy but the same model may not provide improved accuracy at a different workload profile. Therefore, inaccurate forecasting may lead to generation of incorrect frequency and voltage, that does not minimize power dissipation.

Significant effort has been channeled towards making these forecasts of future workload increasingly accurate to enable the processor to optimize energy consumption based on the predicted workload. Several factors contribute to the accuracy of forecasting, including use of extensive historical data and a reasonable time interval between successive historical data. However, as the historical data profile changes, the accuracy of predicting different workload scenarios also changes which leads to incorrect frequency and voltage generation.

Hence, there is a need for selecting an appropriate forecasting model to ensure optimized energy consumption by the processor that alleviates problems associated with conventional models.

OBJECTS

Some of the objects of the framework of the present invention are aimed to ameliorate one or more problems of the prior art or to at least provide a useful alternative and are listed herein below.

An object of the present invention is to provide a set of flexible forecasting models to determine the future workload accurately.

Another object of the present invention is to provide an appropriate model from the pool of models for varying workload history.

Yet another object of the present invention is to provide a pool of forecasting models that are extensible to different approaches.

An additional object of the present invention is to provide methods and systems to optimize power consumption in processors.

Other objects and advantages of the present invention will be more apparent from the following description when read in conjunction with the accompanying figures, which are not intended to limit the scope of the present disclosure.

SUMMARY

This summary is provided to introduce concepts related to optimizing energy consumption in processors. This summary is neither intended to identify essential features of the claimed subject matter nor is it intended for use in determining or limiting the scope of the present disclosure.

In an embodiment, methods and systems for selecting an appropriate forecasting model for accurate workload prediction and optimizing power consumption by a processor is disclosed. The method includes monitoring workload of the processor and extracting workload history of the processor for a given time interval. The method, further, includes creating plurality of forecasting models based on the extracted workload history and storing the plurality of forecasting models in a repository. Further, the method includes applying a forecasting model from the plurality of forecasting models on the extracted workload history. To this end, reiterating the applying step on each of the forecasting models to obtain a predicted future workload for the given time interval and collating the plurality of predicted future workload obtained from each of the plurality of forecasting models. The method, further, includes computing an error measure of the plurality of predicted future workload in reference to an actual workload of the processor. Subsequently, sorting the computed error measure of the plurality of predicted future workload related to each of the forecasting models. Further, the method includes selecting the appropriate forecasting model among plurality of the forecasting models having least error measure among the sorted error measures. Still further, the processor is further configured to scale voltage and frequency to optimize power consumption by the processor, such scaling being based on the workload associated with the selected forecasting model.

BRIEF DESCRIPTION OF ACCOMPANYING DRAWINGS

The detailed description is described with reference to the accompanying figures. In the figures, the left-most digit(s) of FIG. 1 illustrates a block diagram of a dynamic voltage and frequency scaling system, according to an implementation of the present disclosure.

Figure 1:
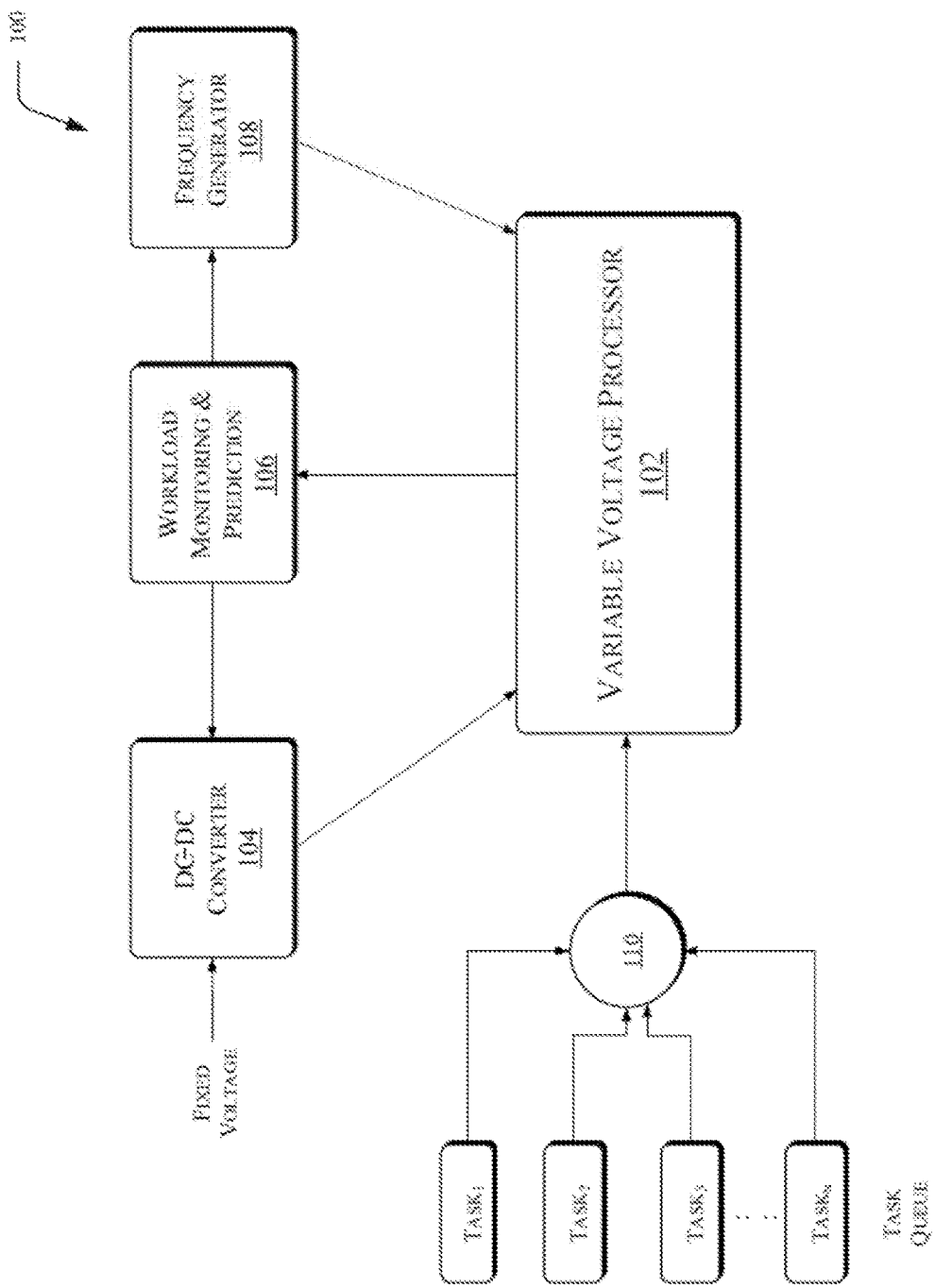

It should be appreciated by those skilled in the art that any block diagrams herein represent conceptual views of illustrative systems embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

The present disclosure relates to a system and a method for manufacturing of a component using knowledge engineering frameworks.

Unless specifically stated otherwise as apparent from the following discussions, it is to be appreciated that throughout the present disclosure, discussions utilizing terms such as "monitoring" or "extracting" or "creating" or "storing" or "applying" or "reiterating" or "collating" or "computing" or "sorting" or "selecting" or the like, refer to the action and processes of a computer system, that manipulates and transforms data represented as physical (electronic) quantities within the computer system's registers and memories into other data similarly represented as physical quantities within the computer system memories or registers or other such information storage, transmission or display devices.

The systems and methods are not limited to the specific embodiments described herein. In addition, modules of each system and each method can be practiced independently and separately from other modules and methods described herein. Each module and method can be used in combination with other modules and other methods.

According to an implementation, the present invention discloses a system and method for selecting an appropriate forecasting model for accurate workload prediction for optimizing power consumption by a processor.

In an embodiment, a system and method of the present invention provides for selecting the most appropriate forecasting model from a group of forecasting models. The workload history of the processor is extracted for a specific time period. Further, multiple forecasting models are created based on the extracted workload history of the processor. The extracted workload history of the processor for the specific time period is applied on the multiple forecasting models to obtain a predicted future workload for each of the forecasting models. Further, error measures against each of the predicted future workloads obtained through their corresponding forecasting model is computed and sorted in an appropriate manner. To this end, the appropriate forecasting model among a plurality of forecasting models is selected based on the forecasting model having a least error measure among the sorted error measures to enable optimized power consumption by the processor.

In another implementation, a technique for predicting a future workload or workload level associated with a processor comprises the following steps. First, a historical workload data associated with the processor is extracted for a given time interval. Then, a group of forecasting models is created based on the extracted historical workload. Further, the future workload is predicted for the given time interval, based on the historical data, using a prediction model from a group of prediction models. The forecasting model may comprise an Auto-Regressive Integrated Moving Average (ARIMA) model, or a Weighted Moving Average model, or an Exponential Smoothing model, or HOLT's model. The forecasting model may be re-created based on the extracted workload history data. The forecasting model may also be re-created based on varying workload condition and workload type which may be obtained from the extracted workload history data.

Further, the forecasting model may predict future workload for a given time interval. Each of the forecasting model from the plurality of forecasting models may predict corresponding future workloads for the given time interval. Each of the predicted future workloads are collated and an error measuring tool computes an error for each of the future workloads obtained through their corresponding forecasting models. The error measuring tool may include Mean Absolute Percentage Error (MAPE) or mean absolute scaled error (MASE) techniques to computer error measures for each of the future workloads. Further, each of the computed error measures is sorted in a particular sequence. The appropriate forecasting model, among the plurality of forecasting models, having the least error measures among the sorted error measures is selected.

In another implementation, the forecasting of the future workload technique of the present disclosure may be adaptive in that it uses certain amount of workload history data to make predictions. The present technique may be able to learn quickly about changes in the workload traffic pattern and make predictions, based on such learning, that are useful for proactive response to workload changes.

In another implementation, the predicted future workload may be used to generate frequency for the processor. Since the future workload is accurately predicted by the appropriate prediction model whose error measure is least, voltage generation which is based on accurately generated frequency is optimum for the processor to give best results.

In another implementation, the extracted workload history may contain historical load execution information pertaining to the processor. The extracted historical information may be stored temporarily in a memory coupled to the processor. The extracted workload history may also comprise plurality of instructions processed by the processor on hourly, daily, weekly and monthly basis or period of time.

In another implementation, the forecasting model includes an Auto-Regressive Integrated Moving Average (ARIMA) model, or a Weighted Moving Average model, or an Exponential Smoothing model, or HOLT's model. In the present implementation, for example, the adaptive and robust ARIMA model predicts the future workload based on an extracted workload history of the processor. In this respect, the amount of data is set by how much data from the historical workload data is needed to uniquely calculate the model parameters, e.g., making sure that the multiple linear regression approach uniquely determine the model parameters. Further, the ARIMA model may be an effective extrapolator. Furthermore, the given amount of historical workload which is used for doing the forecasting, the present disclosure provides that the time series of the extracted historical workload data may be considered to be locally stationary. The approximation may be further improved by applying techniques to improve stationarity, such as first or second order differencing. Further, primary parameters in the approach for the forecasting include the orders of the model, i.e., ARIMA (a,b,c), where 'a' is the order of autoregressive (AR) part, 'b' is the number of non-seasonal differences (I), 'c' is the order of the moving average (MA) part, and the amount of history (nhist intervals) used. The amount of history directly affects the amount of variability in the forecasting (variability approximately scales with 1/squareroot(nhist)), and the responsiveness of the model to sudden traffic changes. Another factor to consider is the choice of the prediction horizon, i.e., the number of intervals ahead that the prediction is supposed to go, since the variability in the prediction approximately scales with the square root of npred, where npred is the prediction horizon.

Likewise, the predicted future workload may be obtained through each of the forecasting models for a given time period. The other forecasting models including a Weighted Moving Average model, or an Exponential Smoothing model, or HOLT's model may provide different predictions of future workload against the same extracted workload history of the processor. Therefore, the appropriate forecasting model to forecast the future workload demand is the forecasting model whose error measure is least.

In another implementation, the computing of error measures for each of the forecasting model is based on Mean Absolute Percentage Error (MAPE) method. The MAPE provides a measure of accuracy of forecasting model in terms of constructing fitted time series values in statistics, specifically in trend estimation. The MAPE usually expresses accuracy as a percentage. In other words, it provides the error measure in terms of the percentage.

In another implementation, the computing of error measures for each of the forecasting models is based on Mean Absolute Scaled Error (MASE) method. The MASE provides the applicable measurement of forecast accuracy without the problems observed in the other measurements. The MASE usually provides a scale-free error metric which may be used to compare forecasted future workload on a single series and also to compare forecast accuracy between series.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processor.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
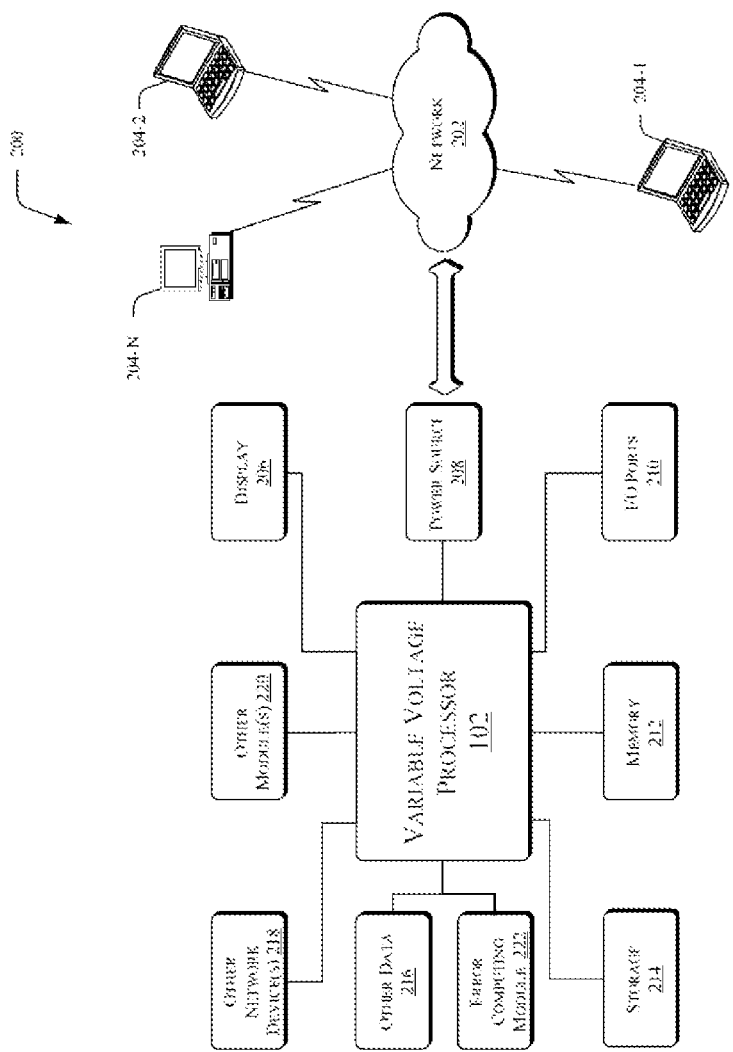
FIG. 2 illustrates a network implementing a system for selecting an appropriate forecasting model for accurate workload prediction of a processor, according to an implementation of the present disclosure.
Figure 3:
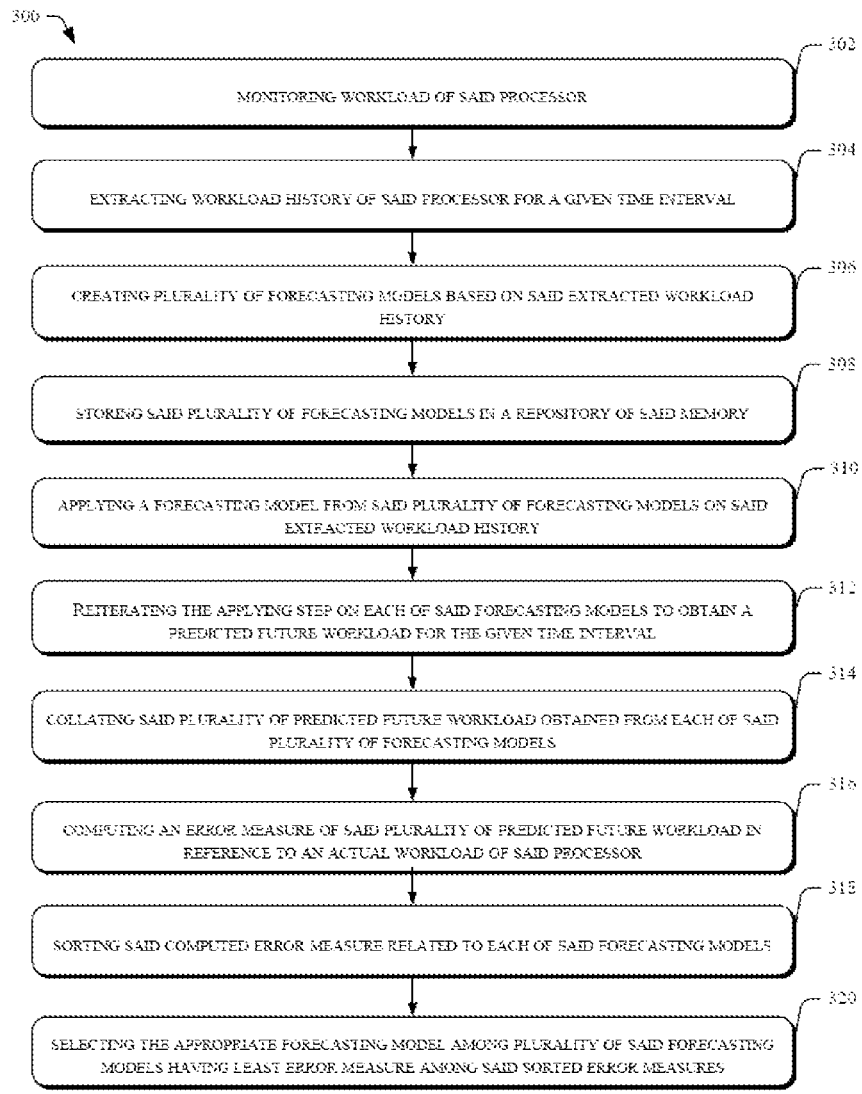
FIG. 3 illustrates a method for selecting an appropriate forecasting model for accurate workload prediction of a processor, according to an implementation of the present disclosure.

The manner, in which the system and method for selecting an appropriate forecasting model for accurate workload prediction of a processor shall be implemented, has been explained in details with respect to the FIGS. 1, 2, and 3.

FIG. 1 illustrates an exemplary block diagram of a dynamic voltage and frequency scaling system 100 of the present invention. The dynamic voltage and frequency scaling system 100 includes a variable voltage processor 102, a DC-DC converter 104, a workload monitoring and prediction 106, a frequency generator 108 and a task queue accumulator 110. The variable voltage processor block 102 interacts with the DC-DC converter 104, the workload monitoring and prediction 106 and the frequency generator 108. A task queue accumulator 110 accepts $task_1 \ldots task_n$ and forms a task queue. The variable voltage processor 102 accepts the tasks as per their order and processes it accordingly. The dynamic voltage and frequency scaling system 100 uniquely forecasts future workload of the variable voltage processor 102. On the basis of the generated future workload, the frequency generator 108 may generate a frequency. Subsequently, based on the frequency, the appropriate voltage would be generated for the variable voltage processor 102, thereby optimizing power consumption by the variable voltage processor 102.

As illustrated by FIG. 1, the variable voltage processor 102 has a certain context in which its voltage generation is applicable. Typically, the generated frequency dictates the terms to generate the voltage for the variable voltage processor 102. Further, it may be understood that the workload or estimated workload of the processor plays an important role in generation of the frequency. Therefore, the accuracy of workload and its respective conditions are important factors for the dynamic voltage and frequency scaling system 100. If the utmost accuracy of the predicted workflow is not achieved, it may lead to generate incorrect frequency and also the incorrect voltage for the dynamic voltage and frequency scaling system 100. Thus, the incorrect voltage does not minimize the power dissipation. Therefore, the present dynamic voltage and frequency scaling system 100 accurately forecast the future workload and also compute the error measures for all the forecasted workload. The final model to forecast the workload is the model whose error measure is least among all the computed error measures. Thus, the present dynamic voltage and frequency scaling system 100 enhances the accuracy of the processor workload forecast and thus optimizes power consumption.

FIG. 2 illustrates a network implementing a computer implemented system 200 for selecting an appropriate forecasting model for accurate workload prediction of a variable voltage processor 102. The computer implemented system 200 can be implemented as a variety of communication devices, such as a laptop computer, a notebook, a workstation, a mainframe computer, a server and the like. The computer implemented system described herein, can also be implemented in any network environment comprising a variety of network devices, including routers, bridges, servers, computing devices, storage devices, etc.

In one implementation, the computer implemented system 200 is connected to one or more computing devices 204-1, 204-2 . . . 204-N, individually and commonly hereinafter referred to as device(s) 204, and storage 214, through a network 202. The devices 204 may be implemented as, but are not limited to, hand-held devices, laptops or other portable computers, tablet computers, mobile phones, personal digital assistants (PDAs), Smartphone, and the like. The devices 204 may be located within the vicinity of the computer implemented system 200 or may be located at different geographic location as compared to that of the computer implemented system. Further, the devices 204 may themselves be located either within the vicinity of each other, or may be located at different geographic locations.

The network 202 may be a wireless or a wired network, or a combination thereof. The network 202 can be a collection of individual networks, interconnected with each other and functioning as a single large network (e.g., the internet or an intranet). The network 202 can be implemented as one of the different types of networks, such as intranet, local area network (LAN), wide area network (WAN), the internet, and such. The network 202 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The storage 214 may be implemented as, but not limited to, enterprise database, remote database, local database, and the like. The storage 214 may be located within the vicinity of the computer implemented system 200 and devices 204 or may be located at different geographic location as compared to that of the computer implemented system 200 and devices 204. Further, the storage 214 may themselves be located either within the vicinity of each other, or may be located at different geographic locations. Furthermore, the storage 214 may be implemented inside the device 204 or inside the system 200 and the storage 214 may be implemented as a single database.

In one implementation, the computer implemented system 200 includes processor(s), such as the variable voltage processor 102. The variable voltage processor 102 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the system 200 having the variable voltage processor 102 includes interface(s) 210. The interfaces 210 may include a variety of software and hardware interfaces that allow the system to interact with the entities of the network 202, or with each other. The interfaces 210 may facilitate multiple communications within a wide variety of networks and protocol types, including wire networks, for example, LAN, cable, etc., and wireless networks, for example, WLAN, cellular, satellite-based network, etc.

The system 200 may also include a memory 212. The memory 212 may be coupled to the variable voltage processor 102. The memory 212 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 200 having the variable voltage processor 102 may include other module(s) 220 and data 216. The other module(s) 220 may be coupled to the variable voltage processor 102 and amongst other things, include routines, programs, objects, components, data structures, etc., which perform particular tasks or implement particular abstract data types. The other module(s) 220 may also be implemented as, signal processor(s), state machine(s), logic circuitries, and/or any other device or component that manipulate signals based on operational instructions. Further, the other module(s) 220 can be implemented in hardware, instructions executed by a processing unit/processor, or by a combination thereof. In another aspect of the present disclosure, the other module(s) 220 may be machine-readable instructions (software) which, when executed by a processor/processing unit, perform any of the described functionalities.

In an implementation, the other module(s) 220 may include programs or coded instructions that supplement applications or functions performed by the system 200. Further, the data 216 may include various data pertaining to the operation of the variable voltage processor 102, and other data. The data 216, amongst other things, may serve as a repository for storing data that is processed, received, or generated as a result of the execution of one or more modules in the other module(s) 220. Although the data 216 is shown internal to the system 200, it may be understood that the data 216 can reside in an external repository or the storage 214, which may be coupled to the system.

In one implementation, the variable voltage processor 102 connected to a power source 208 through which the connection to the network 202 may be established. Further, the variable voltage processor 102 may be connected to a display device 206 to display relevant information pertaining to the operation. The variable voltage processor 102 may further connected other network device(s) 218 to receive the inputs from any other network device(s) apart from the device 204. The display device 206 connected to the variable voltage processor 102 may also be used to show the generated frequency and respective voltage generation graphs to analyze the correlation between them. The display device 206 connected to the variable voltage processor 102 may also be used to show the generated graph of workload in a given time frame processed by the variable voltage processor 102.

In one implementation, the computer implemented system 200 may select an appropriate forecasting model for accurate workload prediction of the variable voltage processor 102. The computer implemented system 200 may include memory 212 which comprises a set of instructions which is executed by the variable voltage processor 102. In this respect, the variable voltage processor 102 is configured to monitor present workload of the variable voltage processor 102. Further, the variable voltage processor 102 is configured to extract workload history of the variable voltage processor 102 for a given time interval. Based on the extracted workload history of the variable voltage processor 102, various forecasting models are created. Further, the created forecasting models are stored in the storage 214. In this respect, the computed error measures corresponding to each of the forecasting module is sorted and stored in the storage 214.

According to the present implementation, each of the forecasting models is applied on the extracted workload history of the variable voltage processor 102 to obtain a predicted future workload for every forecasting model. Further, the predicted future workload for every forecasting model is collated in the storage 214. Further, an error computing module 222 which is attached with the variable voltage processor 102 is configured to compute an error measure for each of the predicted future workload in reference to an actual workload of the variable voltage processor 102.

According to the present implementation, the variable voltage processor 102 is further configured to select the appropriate forecasting model from the group of forecasting models having the least error measure among the error measures for each of the forecasting model. The least error measured forecasting model may be the most accurate forecasting model to predict the future workload of the variable voltage processor 102. Therefore, based on the most accurate future workload of the variable voltage processor 102, the appropriate frequency may be generated. Hence, the appropriate voltage, based on the accurately generated frequency, may be generated for the variable voltage processor 102.

In another implementation, the variable voltage processor 102 is further configured to extract the workload history data. The extracted workload history data may contain historical load execution information pertaining to the variable voltage processor 102. The extracted historical information may be stored temporarily in the memory 212 coupled to the variable voltage processor 102. The extracted workload history may also comprise plurality of instructions processed by the variable voltage processor 102 on hourly, daily, weekly and monthly basis or a period of time.

FIG. 3 illustrates a method 300 for selecting an appropriate forecasting model for accurate workload prediction of a processor according to an embodiment of the present subject matter. The method 300 may be described in the general context of computer executable instructions. Generally, computer executable instructions can include routines, programs, objects, components, data structures, procedures, and modules, functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative method. Additionally, individual blocks may be deleted from the method 300 without departing from the spirit and scope of the subject matter described herein. Furthermore, the method 300 can be implemented in any suitable hardware, software, firmware, or combination thereof. In an example, the method 300 may be implemented in a computing system, such as a computer implemented system 200.

Referring to method 300, at block 302, in an implementation, the processor is configured to monitor workload.

At block 304, in an implementation, the processor is configured to extract workload history of the processor for a given time interval.

At block 306, in an implementation, the processor is configured to create a plurality of forecasting models based on the extracted workload history.

At block 308, in an implementation, the processor is configured to store the plurality of forecasting models in a repository of the memory.

At block 310, in an implementation, the processor is configured to apply a forecasting model from the plurality of forecasting models on the extracted workload history.

At block 312, in an implementation, the processor is configured to reiterate the applying step on each of the forecasting models to obtain a predicted future workload for the given time interval.

At block 314, in an implementation, the processor is configured to collate the plurality of predicted future workloads obtained from each of the plurality of forecasting models.

At block 316, in an implementation, the processor is configured to compute an error measure of the plurality of predicted future workloads in reference to an actual workload of the processor.

At block 318, in an implementation, the processor is configured to sort the computed error measure related to each of the forecasting models.

At block 320, in an implementation, the processor is configured to select the appropriate forecasting model from the plurality of the forecasting models having least error measure among the sorted error measures.

Systems of the instant disclosure are thus configured with a processor that selects the appropriate forecasting model based on the workload associated with the selected forecasting model as described in the methods of the instant disclosure herein above. Selecting of the appropriate forecasting model, by the processor, with accuracy is further followed by the processor scaling the frequency and voltage to optimize power consumption, reducing heat generation and improve performance, stability and efficiency of the processor therein.

Although implementations for selecting an appropriate forecasting model for accurate workload prediction of a processor have been described in language specific to structural features and/or method, it is to be understood that the appended claims are not necessarily limited to the specific features or method described. Rather, the specific features and method are disclosed as exemplary implementations for selecting an appropriate forecasting model for accurate workload prediction of a processor.

What is claimed is:

1. A computer implemented method for optimizing energy consumption by a processor, the method to be executed on a computer, the computer including a memory, the method comprising:
   monitoring workload of said processor;
   extracting workload history of said processor for a given time interval;
   creating a plurality of forecasting models based on said extracted workload history;
   storing said plurality of forecasting models in a repository of said memory;
   applying a forecasting model from said plurality of forecasting models on said extracted workload history;
   reiterating the applying step on each of said plurality of forecasting models to obtain a plurality of future workloads predicted by each of said plurality of forecasting models for the given time interval;
   collating said plurality of predicted future workloads obtained from each of said plurality of forecasting models;
   computing an error measure of said plurality of predicted future workloads with reference to an actual workload of said processor for said time interval;
   sorting said computed error measure related to each of said plurality of forecasting models;
   selecting an appropriate forecasting model among the plurality of said forecasting models based on its least error measure among said sorted error measures for optimizing energy consumption in said processor;
   generating an appropriate frequency based on said predicted future workloads associated with the selected forecasting model; and
   generating an appropriate voltage for said processor based on said generated appropriate frequency.

2. The method of claim 1, wherein extracting said workload history comprises a plurality of instructions processed by said processor on hourly, daily, weekly and monthly period of time.

3. The method of claim 1, wherein creating said plurality of forecasting models is based on varying workload conditions extracted from said workload history.

4. The method of claim 1, wherein creating said plurality of forecasting models is based on varying workload type extracted from said workload history.

5. The method of claim 1, wherein said plurality of forecasting models include at least one of Weighted Moving Average, Exponential Smoothing, Holt and ARIMA.

6. The method of claim 1, wherein computing said error measure is based on MAPE or MASE.

7. A computer implemented system for optimizing energy consumption by a processor, the system comprising:
   a memory coupled to said processor, wherein said memory comprises instructions which, when executed by said processor, cause said processor to:
   monitor workload of said processor;
   extract workload history of said processor for a given time interval;
   create a plurality of forecasting models based on said extracted workload history;
   store said plurality of forecasting models in a repository of said memory;
   apply a forecasting model from said plurality of forecasting models on said extracted workload history;
   reiterate the applying step on each of said plurality of forecasting models to obtain a plurality of future workloads predicted by each of said plurality of forecasting models for the given time interval;
   collate said plurality of predicted future workloads obtained from each of said plurality of forecasting models;
   compute, through an error measuring tool, an error measure of said plurality of predicted future workloads with reference to an actual workload of said processor for said time interval;
   said processor configured to sort said computed error measure related to each of said plurality of forecasting models;
   select an appropriate forecasting model among the plurality of said forecasting models based on its least error measure among said sorted error measures for optimizing energy consumption in said processor;
   generate an appropriate frequency based on said predicted future workloads associated with the selected forecasting model; and
   generate an appropriate voltage for said processor based on said generated appropriate frequency.

8. The system of claim 7, wherein said processor is further configured to extract said workload history comprises a plurality of instructions processed by said processor on hourly, daily, weekly and monthly period of time.

9. A computer program product comprising a non-transitory computer readable storage medium having a computer readable program stored therein, wherein the computer readable program, when executed on a computing device, causes the computing device to:
   monitor workload of a processor;
   extract workload history of said processor for a given time interval;
   create a plurality of forecasting models based on said extracted workload history;
   store said plurality of forecasting models in a repository of said memory;
   apply a forecasting model from said plurality of forecasting models on said extracted workload history;
   reiterate the applying step on each of said plurality of forecasting models to obtain a plurality of future workloads predicted by each of said plurality of forecasting models for the given time interval;
   collate said plurality of predicted future workloads obtained from each of said plurality of forecasting models;
   compute, through an error measuring tool, an error measure of said plurality of predicted future workloads with reference to an actual workload of said processor for said time interval;
   sort said computed error measure related to each of said plurality of forecasting models; and
   select an appropriate forecasting model among the plurality of said forecasting models based on its least error measure among said sorted error measures for dynamically scaling frequency and voltage required by said processor based on the predicted future workloads associated with the selected forecasting model and thereby optimizing energy consumption in said processor.

* * * * *